Patented Dec. 6, 1949

2,490,100

UNITED STATES PATENT OFFICE

2,490,100

PLASTIC FUNGICIDAL COMPOSITION AND METHOD OF MAKING THE SAME

Howard E. Smith, Brooklyn, N. Y., assignor to Insl-X Corporation, Brooklyn, N. Y., a corporation of New Jersey No Drawing. Application December 5, 1944 Serial No. 566,783

13 Claims. (Cl. 106—15)

My invention relates to a novel plastic composition that has fungicidal properties and more particularly my invention relates to a fungicidal plastic or film forming composition containing a plasticizer.

Previously, there have been attempts to make effective fungicidal plastic compositions by adding a fungicide to the finished plastic composition, that is, a composition comprising a resin or plastic, a solvent and plasticizer.

This, however, has proved to be unsatisfactory because the fungicides that I have found most effective are not particularly soluble in organic solvents so that they cannot be properly dissolved in a plastic solution. Thus poor distribution and heterogeneous dispersion of the fungicide results. When dispersion is attempted by extremely fine grinding, many difficulties are encountered in obtaining uniform dispersion. With such poor distribution a much higher fungistatic content must be used to insure obtaining the results desired.

Accordingly, an extremely low level of fungicidal effectiveness has been previously obtained. The inhibition of surface growth is not accomplished by the addition of small quantities of weak fungicides.

When the fungicides are added to the finished plastic composition and mixed therewith their dispersion therein is such that they fail to take the molding cycle, that is, they decompose or react with the unsaturated polymeric resin under heat and pressure. In a thermosetting resin they are reduced by the formaldehyde or urea content. When added for example to an ethyl cellulose composition, no true solution or proper dispersion is obtained. Thus, under these conditions either the temperature of molding or an active ingredient of the plastic composition causes a reaction.

In the electrical industry it is necessary to prohibit the development of growth on the surface of insulators. It has been demonstrated that all of the known plastics have no fungistatic properties in their commercial form.

It is the object of the present invention to provide a novel composition of matter such as a plastic having unusually high germicidal effectiveness.

It is a further object of the present invention to provide a novel method of imparting to a plastic, fungicidal characteristics.

It is a further object of the present invention to obtain a plastic having an unusually high content and an unusually well dispersed fungicide.

The objects of my invention are accomplished generally by effecting a solution in the plasticizer of a fungicide in sufficient concentration so that in the normal use of the plasticizer there will be sufficient fungicide present to impart the desired fungicidal properties to the finished plastic composition.

I have found it extremely desirable to use the fungicide phenyl mercury salicylate because of the following properties, each of which renders it particularly suitable and desirable for imparting fungicidal properties to a plastic composition.

1. High fungicidal effectiveness.
2. Water insolubility.
3. Relative non-toxicity.
4. Thermal stability.
5. Non-ionization.
6. Chemical stability.

However, phenyl mercury salicylate as generally stated above is relatively insoluble in the ordinary solvents. Thus, for example, 100 parts of such solvents as alcohol, acetone, butyl or ethyl acetate dissolve at best only one part of phenyl mercury salicylate.

It is by no means common that a fungicide is compatible with and soluble in the plasticizer, particularly in the concentration necessary for the final end result. For the large part phenyl mercury fungicides are insoluble in or incompatible with normal plasticizer.

Thus, phenyl mercury salicylate, the fungicide I desire to use is insoluble in almost all common plasticizers such as dibutyl phthalate, diethyl phthalate, dimethyl phthalate, diamyl naphthalene, methyl ethyl phthalyl glycollate, tributyl phosphate, castor oil, soya oil. I have found, however, that I can incorporate the phenyl mercury salicylate fungicide into the plasticizer of the tri-aryl phosphate group to a concentrate of the order of 10% by weight of the fungicide to the plasticizer. Typical tri-aryl phosphates are tricresyl, triphenyl and tri(para-tert-butylphenyl) phosphate.

By heating the plasticizer tri-cresyl phosphate to a temperature of 170° C. and then mixing the phenyl mercury salicylate into the tri-cresyl phosphate, complete solution of the phenyl mercury salicylate in the plasticizer is obtained and the phenyl mercury salicylate remains in solution even when the tri-cresyl phosphate is cooled down.

Tri-cresyl phosphate containing 10% by weight of phenyl mercury salicylate can then be added to the resin or plastic composition such as for example cellulosic derivatives such as nitrocellulose, cellulose acetate, higher esters of cellulose, mixed esters such as cellulose aceto-propionate, cellulose aceto-butyrate, cellulose ethers, such as ethyl cellulose, benzyl cellulose and other higher ethers, resins such as vinyl copolymers, such as vinyl chloride and vinyl acetate, vinyl butyral, vinyl acetal-formaldehyde modified, chlorinated rubber, rosin esters, ester gum, acrylics such as methacrylate polymers (methyl, ethyl and isobutyl).

Sufficient of the tri-cresyl phosphate is employed, as for example from 10-50% of the plasticizer, to obtain the desired plasticizing effect. Even when only 10% of the plasticizer is used, there is an over-all concentration of the fungicide phenyl mercury salicylate in the composition of 1% which is sufficient for effective fungicidal action.

By incorporating the fungicide in the plasticizer I obtain a far more effective distribution of the fungicide throughout the plastic and I have found that the fungicide is retained in this distributed form and is far more effective for performing its function than when added in any other way to the composition.

When the plastic composition is formed in the manner described herein, that is when the fungicide is incorporated by first dissolving it in the plasticizer, the stability of the final compound and particularly the fungicide is greatly enhanced.

When the fungicide containing plasticizer is added to ethyl cellulose and properly mixed therewith a true solution or at least a dispersion so close to true solution is obtained that the results over the previous method of adding the fungicide to the finished plastic composition are unexpectedly good.

It will be understood that a variety of methods of admixing the fungicide to the plasticizer can be employed. I have found that the particular combination of phenyl mercury salicylate fungicide and tri-aryl phosphate plasticizer is unique with respect to the solution obtained and the effectiveness of the fungicide in the final plastic product as opposed to the other plasticizers and other fungicides.

I have also found that of all the plasticizers commonly employed, only the tri-aryl phosphate set forth will dissolve phenyl mercury salicylate and can be employed in this process.

The method herein set forth of incorporating the fungicide phenyl mercury salicylate in the plastic composition by first dissolving it in the plasticizer reduces the toxic hazard during the ordinary milling and mixing operations. That is phenyl mercury salicylate, like all mercury compounds, has a definite though low toxicity which must be considered in the handling of the compound. If the phenyl mercury compound were to be added directly to the composition or employed in the solid form, this toxic hazard would be increased. However, by dissolving it in the plasticizer I reduce the toxic hazard to personnel to a minimum.

I claim:

1. A plastic composition comprising an organic plastic material containing uniformly distributed therein a triaryl phosphate plasticizer containing phenyl mercury salicylate dissolved therein.

2. A plastic composition comprising an organic plastic material containing uniformly distributed therein tri-cresyl phosphate containing phenyl mercury salicylate in solution therein.

3. A plastic composition comprising an organic plastic material containing uniformly distributed therein triphenyl phosphate containing phenyl mercury salicylate in solution therein.

4. A plastic composition comprising an organic plastic material containing uniformly distributed therein tri-(para-tert-butyl-phenyl) phosphate containing phenyl mercury salicylate in solution therein 5. A plasticizer composition for imparting plasticity and affording protection against fungi to a plastic material, comprising a triaryl phosphate plasticizer having dissolved therein a phenyl mercury salicylate.

6. A plasticizer composition for imparting plasticity and affording protection against fungi to a plastic material, comprising tri-cresyl phosphate having dissolved therein a phenyl mercury salicylate.

7. A plasticizer composition for imparting plasticity and affording protection against fungi to a plastic material, comprising tri-phenyl phosphate having dissolved therein a phenyl mercury salicylate.

8. A plasticizer composition for imparting plasticity and affording protection against fungi to a plastic material, comprising tri(p-tert-butylphenyl) phosphate having dissolved therein a phenyl mercury salicylate.

9. The method of forming a plasticized fungicide plastic composition which comprises dissolving phenyl mercury salicylate in a triaryl phosphate plasticizer and incorporating this plasticizer composition with an organic plastic material to form a plastic composition.

10. The method of forming a plasticized fungicide plastic composition which comprises dissolving about 10% of phenyl mercury salicylate in a tricresyl phosphate plasticizer and incorporating this plasticizer composition with an organic plastic material to form a plastic composition.

11. The method of forming a plasticized fungicide cellulosic composition from a cellulose derivative which is soluble in organic solvents which comprises dissolving about 10% of phenyl mercury salicylate in a triaryl phosphate plasticizer and incorporating this plasticizer composition into the cellulose organic derivative material.

12. In the method of forming a plasticized fungicide cellulosic derivative composition from a cellulose derivative which is soluble in organic solvents the steps comprising heating a triaryl phosphate to about 170° C., adding about 10% of phenyl mercury salicylate whereby the latter compound is dissolved in the triaryl phosphate.

13. In the method of forming a plasticized fungicide cellulosic derivative composition from a cellulose derivative which is soluble in organic solvents the steps comprising heating a triaryl phosphate to about 170° C., adding about 10% of phenyl mercury salicylate whereby the latter compound is dissolved in the triaryl phosphate and thereafter incorporating this plasticizer into the cellulosic derivative composition.

HOWARD E. SMITH.

REFERENCES CITED

The following references are of record in the file of this patent:

UNITED STATES PATENTS

| Number | Name | Date |
|---|---|---|
| 2,097,339 | Patterson et al. | Oct. 26, 1937 |
| 2,118,787 | Clayton et al. | May 24, 1938 |
| 2,330,998 | Roon | Oct. 5, 1943 |
| 2,343,186 | Hopkinson | Feb. 29, 1944 |
| 2,347,031 | Cupery | Apr. 18, 1944 |
| 2,371,618 | Hanson et al. | Mar. 20, 1945 |
| 2,389,229 | Young | Nov. 20, 1945 |